L. E. HENDEE.
INSULATOR SUPPORT.
APPLICATION FILED JULY 29, 1913.
1,201,295.
Patented Oct. 17, 1916.
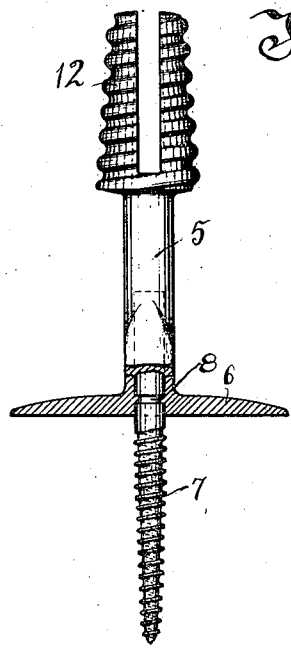
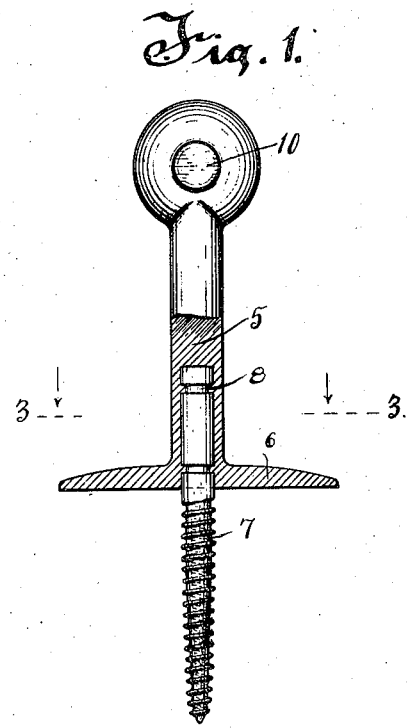
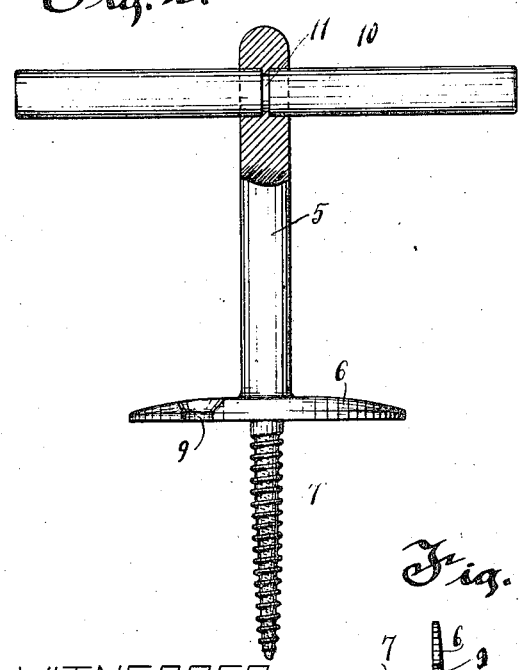
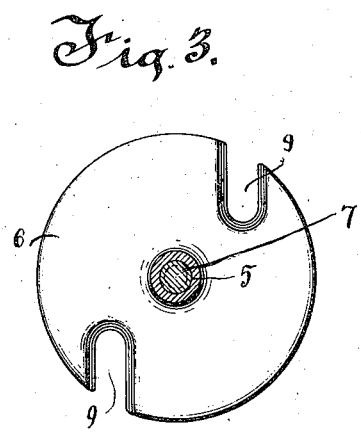
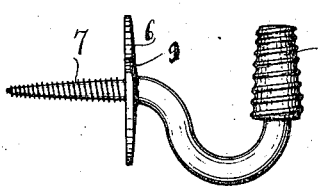
WITNESSES.
C. F. Miller.
E. Schowalter.
INVENTOR
Lem E. Hendee.
By Morsell, Keeney & French
ATTORNEYS.

UNITED STATES PATENT OFFICE.

LEM E. HENDEE, OF MILWAUKEE, WISCONSIN.

INSULATOR-SUPPORT.

1,201,295.  Specification of Letters Patent.  Patented Oct. 17, 1916.

Application filed July 29, 1913. Serial No. 42,510.

*To all whom it may concern:*

Be it known that I, LEM E. HENDEE, a citizen of the United States, and resident of Milwaukee, in the county of Milwaukee and State of Wisconsin, have invented new and useful Improvements in Insulator-Supports, of which the following is a description, reference being had to the accompanying drawings, which are a part of this specification.

The invention relates to insulator supports.

The invention designs more particularly to provide an insulator support comprising a bracket and means for securing the bracket to the member to which it is to be attached.

The invention further designs to provide an insulator support comprising a bracket of cast iron and a steel screw for detachably securing the bracket to a suitable support, which screw is made a part of the bracket by casting said bracket onto the screw.

The invention further designs to provide a new and improved form of insulator support.

The invention consists in the several features hereinafter set forth and more particularly defined by claims at the conclusion hereof.

In the drawings, Figure 1 is an end view of the device embodying the invention, parts being shown in section; Fig. 2 is a side view of the device shown in Fig. 1; Fig. 3 is a section taken on line 3—3 of Fig. 1; Figs. 4 and 5 are views of the devices embodying the invention, showing different forms of brackets.

The invention consists of a bracket 5 having a flat circular shaped base 6 at one end and means for securing an insulator thereto on the other end, and a steel screw 7 which is secured to the shaft and base of the bracket 5 by casting said bracket onto said screw. The casting of the bracket onto the screw is accomplished by placing the steel screw in the mold in proper position and then pouring the iron forming the bracket into the mold to surround and inclose a portion of the screw. To permit a closer union between the screw and the bracket, circular grooves 8 are provided in the screw into which a portion of the metal forming the bracket flows. The base 6 of the bracket 5 is provided with diagonally disposed slots 9 offset from the center of the bracket and adapted to receive nails which are driven into the support to which the bracket is attached and thus serve to prevent turning of the bracket on the support.

In Figs. 1 and 2 I have shown a steel rod provided with a groove 11 similar to the grooves 8 and for a similar purpose about which one end of the bracket 5 is cast for securing insulator spools at either end of the rod and in Fig. 4 I have shown the end 12 of the bracket 5 shaped to accommodate a threaded insulator.

In Fig. 5 I have shown a bracket similar to those previously described with the exception that the bracket 5' is shaped so as to dispose its threaded end 12' parallel to the base 6 so that the bracket may be used on a vertical support.

By casting the bracket about the steel screw I am able to produce an insulator bracket which can be easily screwed into place in the support without using any tools or screws as the operator simply turns the screw into the wood support and if necessary drives nails into the slots in the base to prevent its turning.

The invention is not to be restricted to the details of construction herein set forth, but may be varied so as to be within the scope of the appended claims.

What I claim as my invention is:—

1. An insulator support comprising a cast metal bracket, a steel screw for fastening the bracket to a support having a plurality of annular grooves therein at its upper end, a steel rod for supporting the insulators and having an annular groove therein, the upper part of the bracket being cast around the rod about the groove and the lower part of the bracket being cast around the upper end of the steel screw.

2. An insulator support for spool insulators comprising a cast iron bracket, means for securing said bracket to a support comprising a steel screw onto which the bracket is cast, and means for securing the insulators to said bracket comprising a steel rod around which a portion of the bracket is cast.

In testimony whereof, I affix my signature, in presence of two witnesses.

LEM E. HENDEE.

Witnesses:
 W. D. KYLE,
 C. J. REMONT.